United States Patent [19]
Corwith

[11] Patent Number: 5,612,995
[45] Date of Patent: Mar. 18, 1997

[54] METHOD FOR ACTIVATING A LAMP ON ANALOG CUSTOMER PREMISES EQUIPMENT BY A DIGITAL SIGNAL

[75] Inventor: John T. Corwith, West Chicago, Ill.

[73] Assignee: Lucent Technologies Inc., Murray Hill, N.J.

[21] Appl. No.: 575,791

[22] Filed: Dec. 22, 1995

[51] Int. Cl.⁶ .................................................. H04M 1/00
[52] U.S. Cl. .......................... 379/377; 379/67; 379/350; 379/399
[58] Field of Search .................... 379/67, 88, 89, 379/84, 373, 376, 372, 215, 396, 164, 165, 166, 339, 350, 353, 377, 387, 399

[56] References Cited

U.S. PATENT DOCUMENTS

| | | | |
|---|---|---|---|
| 4,438,506 | 3/1984 | Strom | 379/376 |
| 4,969,186 | 11/1990 | Sayre, II | 379/376 |
| 5,280,523 | 1/1994 | Lee | 379/376 |
| 5,305,377 | 4/1994 | D'Arcy et al. | 379/399 |
| 5,384,832 | 1/1995 | Zimmerman et al. | 379/67 |
| 5,448,635 | 9/1995 | Biehl et al. | 379/399 |
| 5,521,964 | 5/1996 | Schull et al. | 379/88 |

*Primary Examiner*—Krista M. Zele
*Assistant Examiner*—Scott L. Weaver
*Attorney, Agent, or Firm*—Mony R. Ghose

[57] ABSTRACT

An apparatus and method for illuminating a message lamp on analog customer premises equipment (CPE) under the control of a digital switch. A message conversion circuit (MCC) which is positioned intermediate to the digital switch and the analog CPE controls an on-hook isolation and relay circuit to selectively connect the subscriber line associated with the analog CPE with a voltage supply to illuminate the message lamp.

4 Claims, 3 Drawing Sheets

5,612,995

METHOD FOR ACTIVATING A LAMP ON ANALOG CUSTOMER PREMISES EQUIPMENT BY A DIGITAL SIGNAL

TECHNICAL FIELD

This invention relates to telecommunications networks, and more particularly, to an apparatus and method for activating a "waiting message" indicator lamp on analog customer premises equipment by extending a signaling message from a digital switch in such telecommunications networks.

BACKGROUND OF THE INVENTION

In the telecommunications equipment industry, new systems are developed to enhance the efficiency and reliability of communications services. These technologically advanced systems are ultimately deployed in the public-switched telephone network (PSTN) to provide subscribers with previously unavailable features. Evidence of the technological evolution occurring in the PSTN is the replacement of older, analog switches with digital switches. Organizations which operate private switches, such as private branch exchanges (PBXs), are often required to upgrade the PBX to reap the benefit of a technological advance. In some cases, these organizations are instead opting to abandon the older analog private branch exchange (PBX), and its associated high maintenance/upgrade cost. Indeed, many organizations which were previously sewed by PBXs now subscribe to services, such as Centrex and voice mail, provided by a local exchange carrier (LEC). Since the LECs are diligent in their efforts to provide the most advanced features to their customers, the formerly PBX-dependent organizations enjoy the option of subscribing to new features without investing in upgrades of their telecommunications switching equipment.

Although an investment in advanced customer premises equipment (CPE) is not usually required when an organization decides to replace an analog PBX with service from a LEC digital central office switch, there are some service features provided by the digital switch which are incompatible with certain types of CPE. Particularly, many hotels have older, guest room telephones equipped with a neon message lamp which indicates to the hotel guest that a telephone message is waiting for retrieval. Traditionally, the message lamp is illuminated by a 90 volt potential supplied by the hotel's private branch exchange via the guest room telephone line. Digital central office switches, however, provide a "waiting message" indication by delivering a frequency shift key (FSK) signaling message on an appropriate subscriber line to illuminate a light emitting diode (LED) "message waiting" light which is found on new "digital" telephone equipment. Indeed, continuously supplying 90 volts on a subscriber line to illuminate a neon message lamp found on older telephones would require an expensive modification to the digital switch, and would also pose a safety hazard for technicians working at the control office, who need to access the subscriber line for routine maintenance. Nevertheless, the inability of a service-oriented organization, such as a hotel, to automatically notify guests of waiting messages would result in guest inconvenience and frustration. Therefore, there is a need in the art for a cost-effective mechanism to safely activate a neon message lamp on existing customer premises equipment in response to signaling messages from a digital central office switch.

SUMMARY OF INVENTION

This need is addressed and a technological advance is achieved by the method and system of the present invention which positions a message conversion circuit (MCC) on a subscriber line (cable pair) intermediate to a telephone or other CPE with a neon message lamp and a digital switch which serves the telephone.

In a preferred embodiment of the present invention, an on-hook isolation and neon lamp relay control unit is operated by a micro-controller in the MCC. The relay unit inter-connects subscriber-side cable pair wires to a voltage supply unit when illumination of the neon message lamp is necessary. An FSK decoder unit in the MCC is inter-connected to network-side cable pair wires to intercept "waiting message" indications from the digital switch. The relay unit, under the control of the MCC, disconnects the voltage supply and reconnects subscriber-side cable pair wires and network-side cable pair wires in response to an "off-hook" or "ring line" message detected by the MCC.

DETAILED DESCRIPTION

Figure 1:
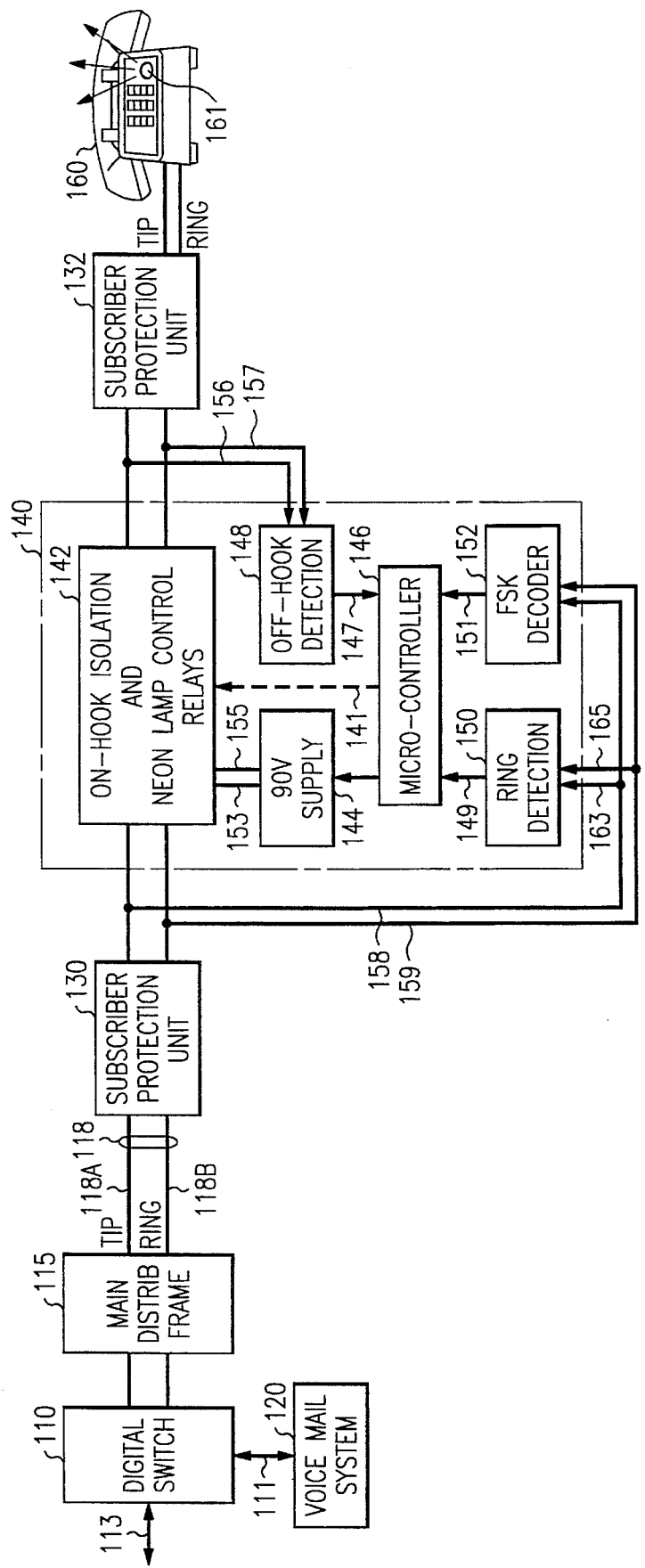
FIG. 1 shows a simplified block diagram of a telecommunications system in which the present invention may be practiced.

FIG. 1 shows telecommunications system 100 comprising a LEC-maintained digital central office switch 110 inter-connected to voice mail system 120 via message link 111. Digital switch 110 is inter-connected to the rest of the PSTN via bi-directional trunk 113. For purposes of example, assume that a large hotel has decided to discontinue use of its private branch exchange (not shown) for providing telecommunications services. Instead, each hotel telephone is now served by digital central office switch 110. Also assume that the hotel subscribes to a LEC-provided voice mail service for each of its hotel telephones. Due to the prohibitive cost of replacing each telephone unit, the hotel continues to employ older model telephones in many of its guest rooms. Each of these older phones 160 is equipped with a standard 90 volt neon message lamp 161.

Subscriber lines (or "cable pairs") served by digital switch 110 are typically extended by a telephone cable to main distributing frame 115. Main distributing frame 115 is inter-connected to switch 110 by each cable pair. For clarity, assume that switch 110 serves a single cable pair, in this case, cable pair 118. Cable pair 118 is comprised of two wires, traditionally known as "tip" wire 118A and "ring" wire 118B. Cable pair 118 terminates at main distributing frame 115 at a network-side of the cable pair, and at hotel telephone 160 at a subscriber-side of the cable pair. Subscriber protection units 130 and 132 are positioned on cable pair 118 intermediate to main distributing frame 115 and telephone 160 to protect the digital switch and the hotel telephone from extreme unforeseen events, such as lightening-induced power surges. Subscriber protection units 130 and 132 are not activated by relatively low potentials, such as 90 volts.

Message conversion circuit (MCC) 140 separates the network-side and subscriber-sides of cable pair 118. MCC 140 connects to existing wiring, and enables the illumination of message lamp 161 on hotel telephone 160 under control of signals from digital central office switch 110. MCC 140 comprises on-hook isolation and neon lamp relay control circuit 142, 90 volt potential unit 144, micro-controller 146, off-hook detection unit 148, ring detection unit 150, and frequency shift key (FSK) decoder unit 152. In alternative embodiments, MCC can serve multiple lines and microcontroller 146 can serve a plurality of message lamps. The various internal components of message conversion unit 140 are inter-connected by designated links. Particularly, micro-controller 146 is inter-connected to relay control unit 142 by link 141. Signaling links 147, 149 and 151 inter-connect the micro-controller to off-hook detection unit 148, ring detection unit 150 and FSK decoder unit 152, respectively. Ninety (90) volt potential 144 has positive lead 153 and negative lead 155 which terminate in relay control circuit 142. Off-hook detection unit 148 has first link 156 and second link 157 which terminate on tip wire 118A and ring wire 118B, respectively. Similarly, FSK decoder unit 152 comprises first link 158 and second link 159 which terminate on tip wire 118A and ring wire 118B, respectively. Ring detection unit 150 includes links 163 and 165 which terminate on links 158, and 159, respectively.

During operation, assume that an incoming call destined for telephone 160 is received in digital switch 110 via trunk 113. After a predetermined number of unanswered rings, digital switch 110 forwards the call to voice mail system 120 over signaling link 111. Voice mail system 120 processes the call, as is known in the art. If the caller chooses to leave a message, a "message waiting" indication is extended by voice mail system 120 to digital switch 110 via link 111. In this case, digital switch 110 extends a "message waiting" indication in FSK format to telephone 160 via cable pair 118. The FSK message is intercepted and retrieved by FSK decoder trait 152 via signaling links 158, 159. The FSK message is interpreted by decoder unit 152, and recognized to be a "message waiting" indication. A waiting message indication is transmitted by FSK decoder 152 to micro-controller 146 over data link 151. Upon receipt of the waiting message indication, micro-controller 146 uses on-hook isolation and relay control unit 142 to disconnect cable pair 118 from the network (or telecommunications system 100). If the message is retrieved, voice mail system 120 extends a "no message" signal to digital switch 110 and the MCC undergoes a similar process to deactivate the voltage supply and reconnect the subscriber line to the network.

Figure 2:
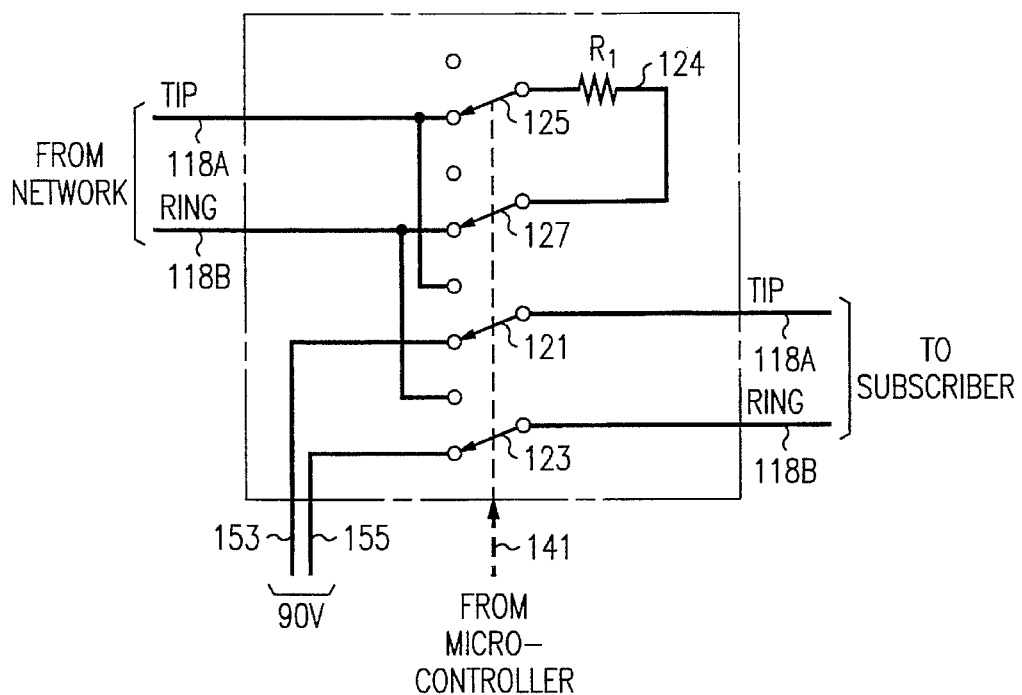
FIG. 2 shows the on-hook isolation and neon lamp control relays of FIG. 1 operating in a "message waiting" mode.

FIG. 2 shows on-hook isolation and relay control unit 142 operating in a "message waiting" mode. In other words, the embodiment shown reflects the state of the circuit when neon message lamp 161 of telephone 160 is illuminated. In "message waiting" mode, switches 121 and 123, which are associated with the subscriber-side of tip wire 118A and ring wire 118B, are positioned to contact positive lead 153 and negative lead 155 of 90 volt potential unit 144. Attachment of the subscriber-side cable pair wires to 90 volt potential unit 144 illuminates neon message lamp 161 on telephone 160. In "message waiting" mode, resistance circuit 124 is inter-connected to the network-side of tip wire 118A and ring wire 118B by switches 125 and 127, respectively. In the preferred embodiment, the value of resistor R1 is approximately 50 ohms. Resistance circuit 124 must be connected to the network-side of the tip wire 118A and ring wire 118B so that telephone 160 does not project an "off-hook" appearance to switch 110. By connecting only the subscriber-side of the cable pair wires to voltage supply unit 144, the application of 90 volts to the entire length of the subscriber line (that is, from main distributing frame 115 to telephone 160), and the safety hazards associated therewith, are eliminated. Off-hook detection unit 148 monitors the subscriber-side of cable pair 118 via links 156 and 157 to determine when a user of telephone 160 alters the state of the telephone to place a call. If off-hook status is detected, an off-hook message is extended by unit 148 to microcontroller 146 via link 147, Similarly, ring detection unit 150 monitors the network-side of cable pair 118 for a "ring subscriber line" message from switch 110 via links 158 and 159. If such a message is detected, unit 150 extends a "ring line" message to micro-controller 146 via link 149.

Figure 3:
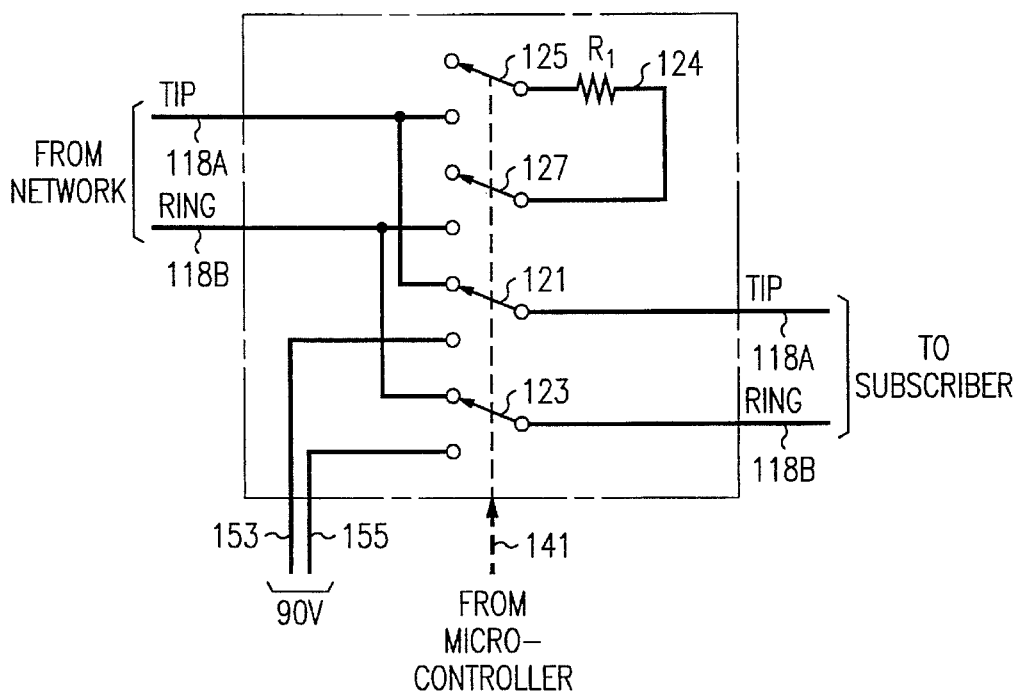
FIG. 3 shows the on-hook isolation and neon lamp control relays of FIG. 1 operating in "no message waiting" mode.

FIG. 3 shows on-hook isolation and neon lamp relay control circuit 142 operating in a "no message waiting" mode. In other words, this embodiment shows circuit 142 operating in a mode when neon message lamp 161 is not illuminated. Neon message lamp 161 can not be illuminated whenever the network and subscriber sides of cable pairs wires 118A and 118B are connected (that is, when telephone 160 is off-hook or, the subscriber line is ringing). In the embodiment shown, switches 121 and 123 are positioned so that the switches contact network-side tip wire 118A and network-side ring wire 118B, respectively. Potential unit 144 and resistance circuit 124 are unconnected to cable pair 118.

Figure 4:
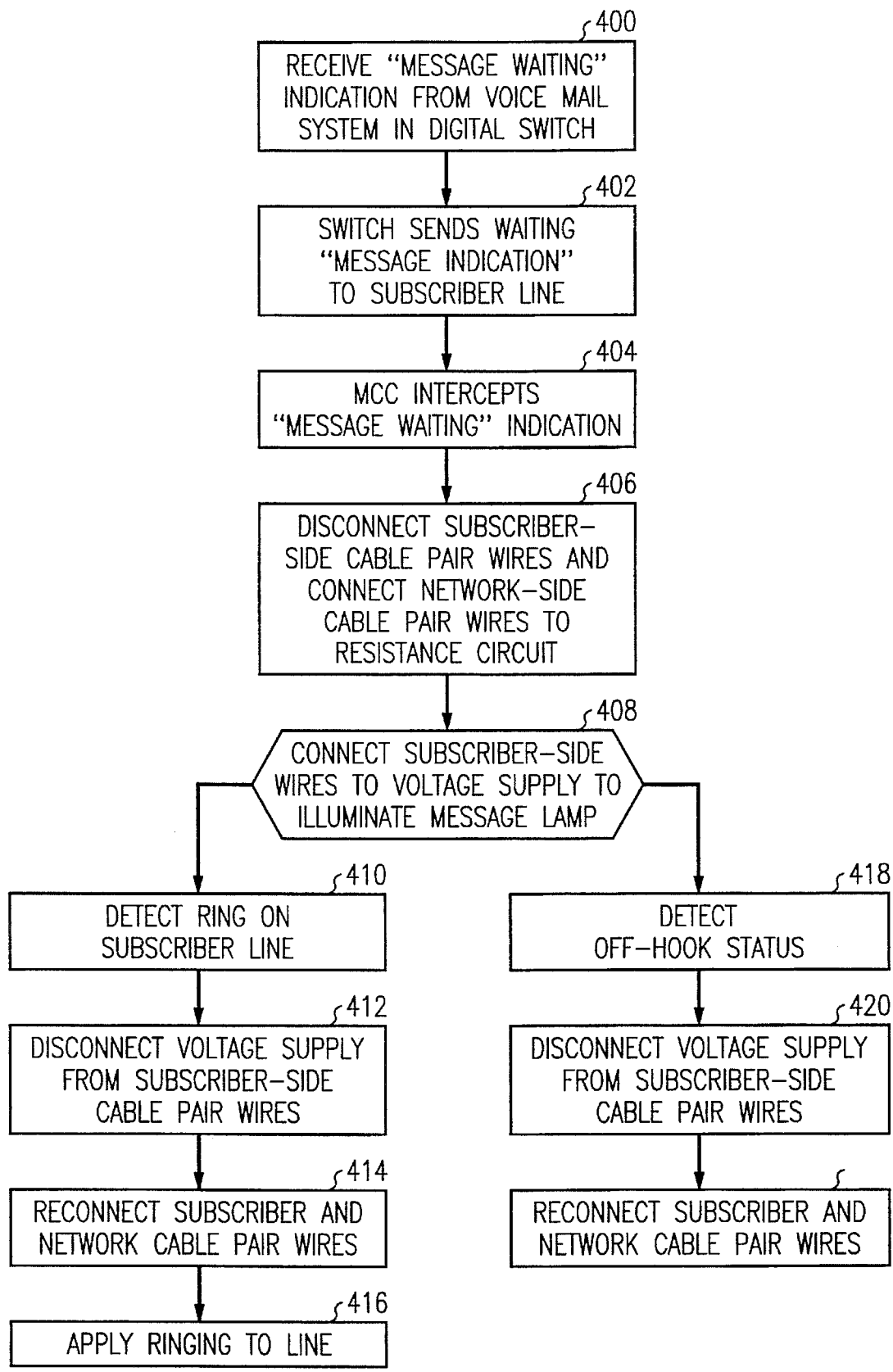
FIG. 4 shows a flow diagram of the steps performed in the telecommunications system of FIG. 1 in accordance with the method of the present invention.

FIG. 4 is a flow diagram of the steps performed in telecommunications system 100 in accordance with the preferred embodiment of the method of the present invention. For purposes of example, assume that a caller initiates a call to a called party associated with hotel telephone 160. The called party is unavailable, so the caller leaves a message with automated voice mail system 120. The process begins in step 400 when digital switch 110 receives a "waiting message" notification from voice mail system 120 via link 111. In step 402, switch 110 sends a "waiting message" indication in FSK format over cable pair 118 to telephone 160.

The process continues to step 404 in which the "waiting message" indication is intercepted by MCC 140. In step 406, MCC 140 disconnects the subscriber-side of cable pair 118 from the network (or system 100), and connects the network-side of cable pair 118 to resistance circuit 124. In step 408, MCC 140 connects the subscriber side of cable pair 118 to 90 volt potential unit 144 to illuminate neon message lamp 161 on telephone 160.

If an incoming call is directed to telephone 160 while message lamp 161 is illuminated, the process continues to step 410 in which a "ring line" message from switch 110 is detected on the network side of cable pair 118 by ring detection unit 150 of MCC 140. In step 412, MCC 140 disconnects the 90 volt potential from cable pair 118 turning the lamp out. The process continues to step 414 in which MCC 140 reconnects the network and subscriber sides of cable pair 118. In step 416, ringing is applied to telephone 160 via cable pair 118, as is known in the art. Alternatively, if a user of telephone 160 chooses to place a call without retrieving a waiting message, the process continues from step 408 to step 418 in which off-hook status of the telephone is detected by MCC 140. In step 420, MCC disconnects the subscriber side of cable pair 118 from 90 volt potential unit 144 again, turning the lamp out. The process continues to step 422 in which MCC 140 re-connects the network and subscriber sides of cable pair 118 so an outgoing call can be placed from telephone 160. When the telephone goes on hook again, the micro-controller 146 will cause the voltage supply to be reconnected.

Advantageously, MCC 140 enables an older model telephone with a voltage-dependent message lamp to be served by digital central office switch without requiring alterations in the switch or building wiring creating a safety hazard. While the invention has been particularly illustrated and described with reference to the preferred embodiment, numerous other arrangements could be devised by those skilled in the art without departing from the scope of the invention.

What is claimed is:

1. In a telecommunications system comprising at least one digital central office switch serving at least one subscriber line connected to a telephone with an integrated message lamp illuminated by voltage applied to the subscriber line, a method for illuminating the message lamp under control of the digital central office switch comprises the steps of:

receiving a waiting message indication from the switch in a message conversion circuit;

disconnecting a subscriber-side of the message conversion circuit from the subscriber line upon receipt of the waiting message indication; and connecting the subscriber-side of the message conversion circuit to a voltage supply unit to illuminate the integrated message lamp.

2. The method of claim 1 further comprising the steps of:

detecting an off-hook status on the subscriber line; and reconnecting the subscriber-side of the message conversion circuit to the subscriber line, and reconnecting a network-side of the message conversion circuit to the subscriber line in response to detection of the off-hook status.

3. The method of claim 1 further comprising the steps of:

detecting a ring signal on the subscriber line; and the message conversion circuit connecting network-side cable pair wires with subscriber-side cable pair wires of the subscriber line in response to the ring signal.

4. The method of claim 1 further comprising the step of:

connecting a network-side of the subscriber line to a resistance circuit when the subscriber-side of the subscriber line is connected to the voltage supply unit.

* * * * *